United States Patent

Auge et al.

Patent Number: 5,251,061
Date of Patent: Oct. 5, 1993

[54] TELECOMMUNICATIONS SYSTEM HAVING FIBER OPTICAL AMPLIFIERS FOR TRANSMITTING SIGNALS OVER LONG DISTANCES

[75] Inventors: Jacques Auge, Saint Cheron; Jean-Pierre Blondel, Viroflay; Hervé Février, Massy; Jean-Francois Marcerou, Courcouronnes, all of France

[73] Assignee: Alcatel N.V., Netherlands

[21] Appl. No.: 872,177

[22] Filed: Apr. 22, 1992

[30] Foreign Application Priority Data

Apr. 22, 1991 [FR] France .................... 91 04930

[51] Int. Cl.$^5$ .................. H01S 3/30; H01S 3/06; G02C 6/26
[52] U.S. Cl. .................... 359/341; 359/343; 372/6
[58] Field of Search ........... 359/341, 342, 343; 385/122; 372/6

[56] References Cited

U.S. PATENT DOCUMENTS

| | | | |
|---|---|---|---|
| 4,595,837 | 9/1990 | Fevrier et al. | 372/6 |
| 5,067,789 | 11/1991 | Hall et al. | 359/341 |
| 5,087,108 | 2/1992 | Grasso et al. | 372/6 |

*Primary Examiner*—Nelson Moskowitz
*Attorney, Agent, or Firm*—Sughrue, Mion, Zinn, Macpeak & Seas

[57] ABSTRACT

A telecommunications system having erbium-doped fiber optical amplifiers for transmitting signals including at least one signal at a wavelength of about 1550 nm, wherein the amplifiers are fibers whose cores are doped with erbium and germanium and are free from aluminum; and wherein for each of the amplifiers, the length of the fiber and the pumping power which is injected therein are such that the noise generated by the fiber is generally emitted around 1550 nm. As can be seen in FIG. 4, the signal-to-noise ratio remains satisfactory after 10,000 km of propagation without using an intermediate filter.

2 Claims, 3 Drawing Sheets

TELECOMMUNICATIONS SYSTEM HAVING FIBER OPTICAL AMPLIFIERS FOR TRANSMITTING SIGNALS OVER LONG DISTANCES

The present invention relates to a telecommunications system having erbium-doped fiber optical amplifiers for transmitting optical signals at a wavelength of 1550 nanometers over long distances, the system being particularly applicable to undersea telecommunications.

BACKGROUND OF THE INVENTION

For links that are several thousand kilometers long, systems have already been proposed comprising a cascade of erbium-doped optical fiber optical amplifiers.

The article "Demonstration of transmission at 2.4 Gbit/s over 12,000 km" by L. F. Mollenauer, B. M. Nyman, M. J. Neubelt, G. Raybon, and S. G. Evangelides, published in Electronics Letters, Jan. 17, 1991, Vol. 27, No. 2, describes a 12,000 km link using signals at a wavelength of 1531.9 nm.

The article entitled "Non-regenerative optical transmission experiments using 12 Er. doped fiber amplifiers" by Noboru Edegava, Yoshihiro Yoshida, Hidenori Taga, Shu Yamamoto, Kiyofumi Mochizuki, and Hiroharu Wakabayashi, published in ECOC' 89, post deadline paper PDA-8, Gothenburg 1989, describes a 902 km link using signals at a wavelength of 1536 nm.

The article entitled "Demonstration of optical pulse propagation over 10,000 km of fiber using recirculating loop" by D. J. Malyon, T. Widdowson, E. G. Bryant, S. F. Carter, J. V. Wright, and W. A. Stalard, published in Electronics Letters, Jan. 17, 1991, Vol. 27, No. 2, relates to a 10,000 km link using signals at 1560 nm.

All of the above proposed systems include optical fiber amplifiers whose silica cores are doped either with aluminum and erbium, or with aluminum, germanium, and erbium. There appears to be no need to interpose optical fibers between the amplifiers in such systems.

In contrast, if optical fibers of the above type are used for transmitting signals at wavelengths of the order of 1550 nm, it is essential to put optical fibers between the amplifiers in order to limit noise. A system of this kind is described in the article "An over 2200 km coherent transmission experiment at 2.5 Gbit/s using erbium-doped fiber amplifiers" by Shigeru Saito, Takamasa Imai, Toshihiko Sugie, Norio Ohkawa, Yasutaka Ichihashi, and Takeski Ito, published in OFC' 90, San Francisco, PD2-1.

An object of the present invention is to implement a system suitable for transmitting signals at 1550 nm, that does not require intermediate optical fibers that are too difficult to match, and that can be used on very long distance links, e.g. transatlantic links.

SUMMARY OF THE INVENTION

The present invention provides a telecommunications system having erbium-doped fiber optical amplifiers for transmitting signals including at least one signal at a wavelength of about 1550 nm, wherein:

said amplifiers are fibers whose cores are doped with erbium and germanium and are free from aluminum; and for each of said amplifiers, the length of said fiber and the pumping power which is injected therein are such that the noise generated by said fiber is generally emitted around 1550 nm.

In such a telecommunications system, the above-defined amplifiers possess, quite surprisingly, a self-filtering function around 1550 nm.

Thus, a signal at a wavelength of 1550±4 nm takes advantage of the same gain as the noise and is not subject to competition therewith; the system of the invention can thus be used for links that exceed 10,000 km.

In a system of the invention, the above-defined amplifiers may be implemented at a spacing of up to 300 km, without using intermediate optical filters.

For example, the core doping concentrations of the fibers used may be such that:

the germanium concentration is greater than 2%; and
the erbium concentration lies in the range 0.1 parts per billion (ppb) to 500 parts per million (ppm).

Each amplifier has a fiber whose length lies in the range 1 m to 60 km. The pumping power injected into the erbium-doped fiber lies in the range 2 mW to 300 mW, and is at a wavelength of 980+40 nm and/or of 1480 nm ± 40 nm.

BRIEF DESCRIPTION OF THE DRAWINGS

Embodiments of the invention are described by way of example with reference to the accompanying drawings, in which.

DETAILED DESCRIPTION

A prior art system and a system of the invention are compared, each comprising fifty kilometers of erbium-doped optical fiber optical amplifier.

Figure 1:
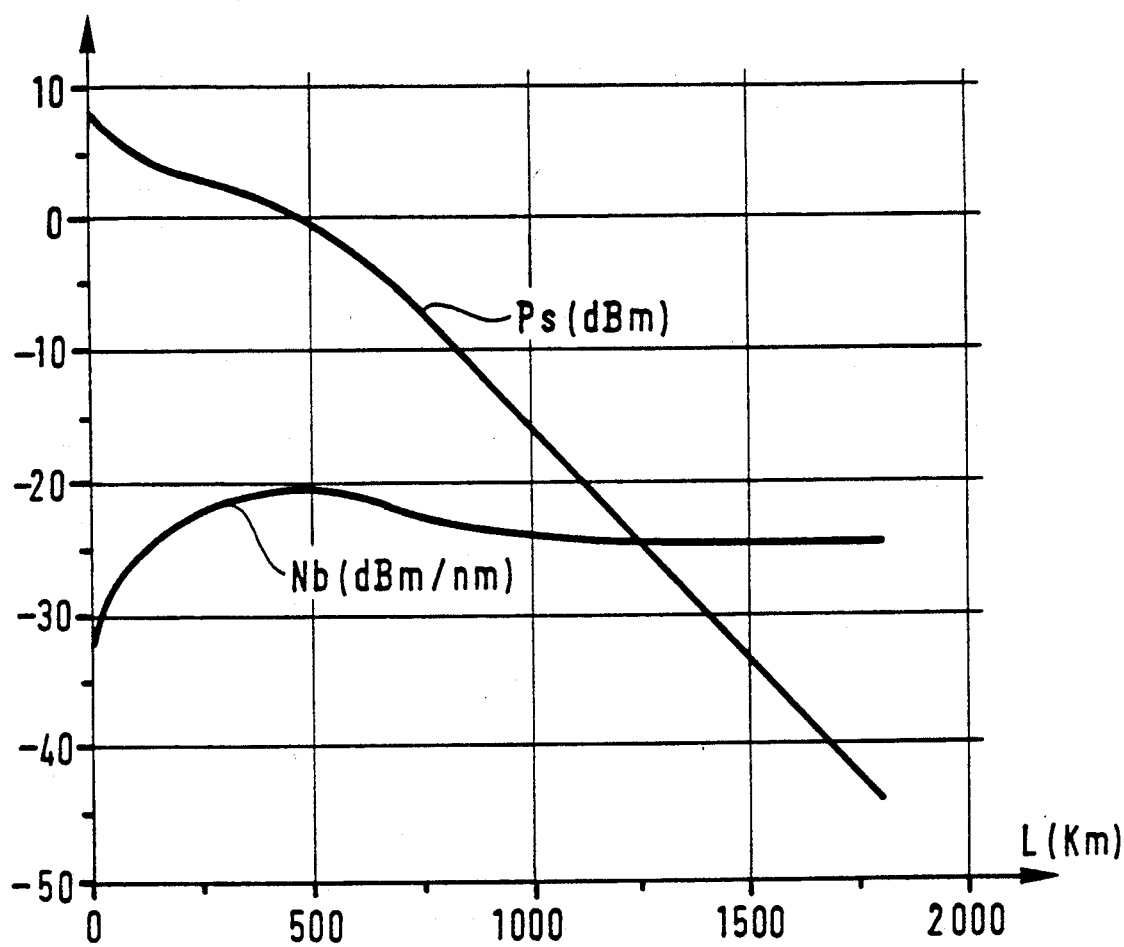
FIG. 1 shows the results given by a prior art system, with variations in the power Ps(dBm) of the 1550 nm signal from the amplifiers and variations in the corresponding noise level Nb(dBm/nm) being plotted as a function of length L (km)

The results of the prior art system using an input signal at 1550 nm are shown in FIG. 1. It can be seen that after about 1250 km, the signal-to-noise ratio becomes too small.

In the system of the invention, each optical amplifier possesses a fiber which is doped as follows:

germanium content equal to greater than 2%;
erbium content lying in the range 0.1 ppb to 500 ppm. The length of the fiber is 25 m; the injected pumping power is 6 mW at a wavelength close to 1480 nm.

Figure 2:
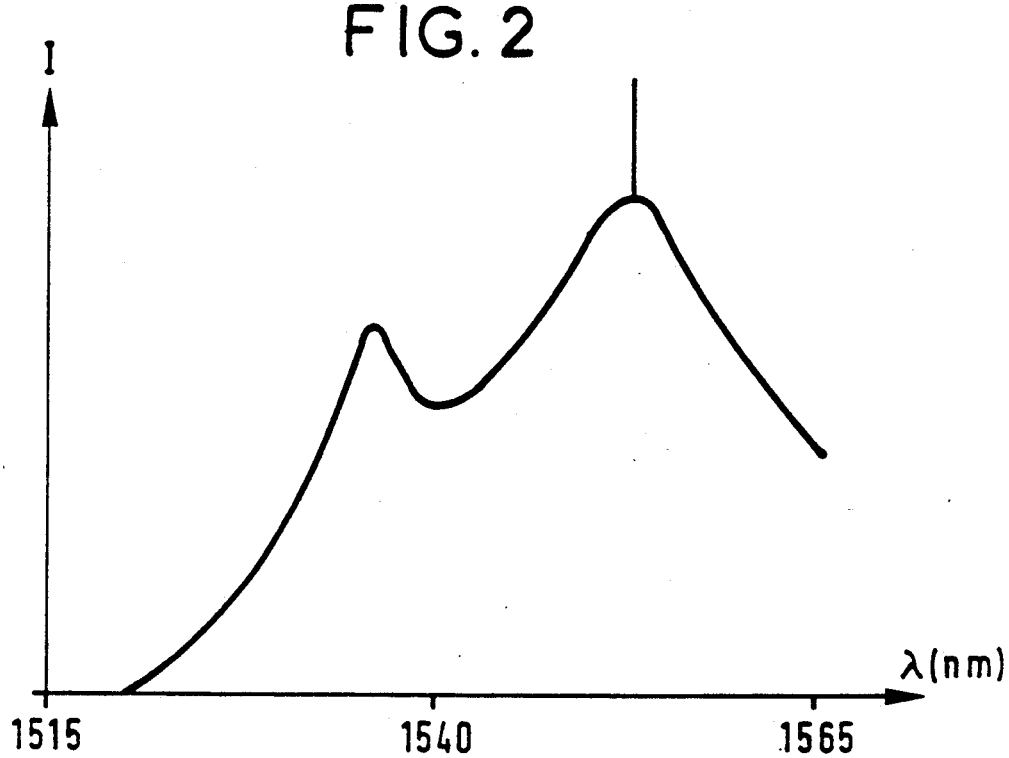
FIG. 2 shows the spectrum of the signal emitted by a system of the invention after 1000 km: I (log scale, arbitrary units) as a function of λ (nm)

FIG. 2 shows the spectrum of the signal after propagation over 1000 km.

Figure 3:
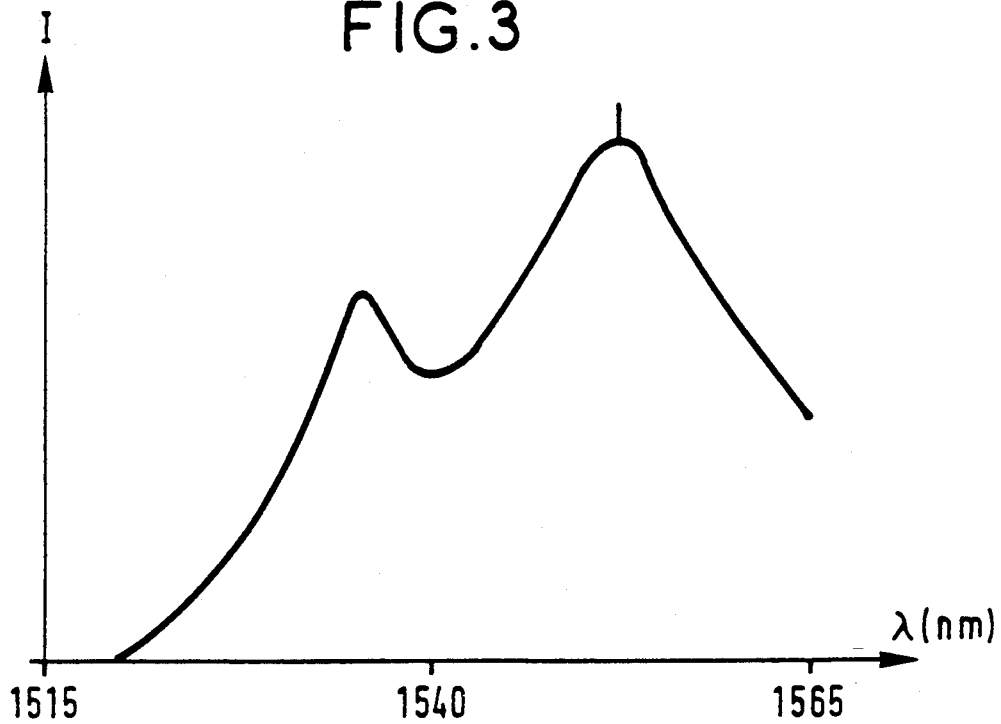
FIG. 3 is analogous to FIG. 2, but corresponds to a distance of 10,000 km.

FIG. 3 shows the spectrum of the signal after propagation over 10,000 km.

Figure 4:
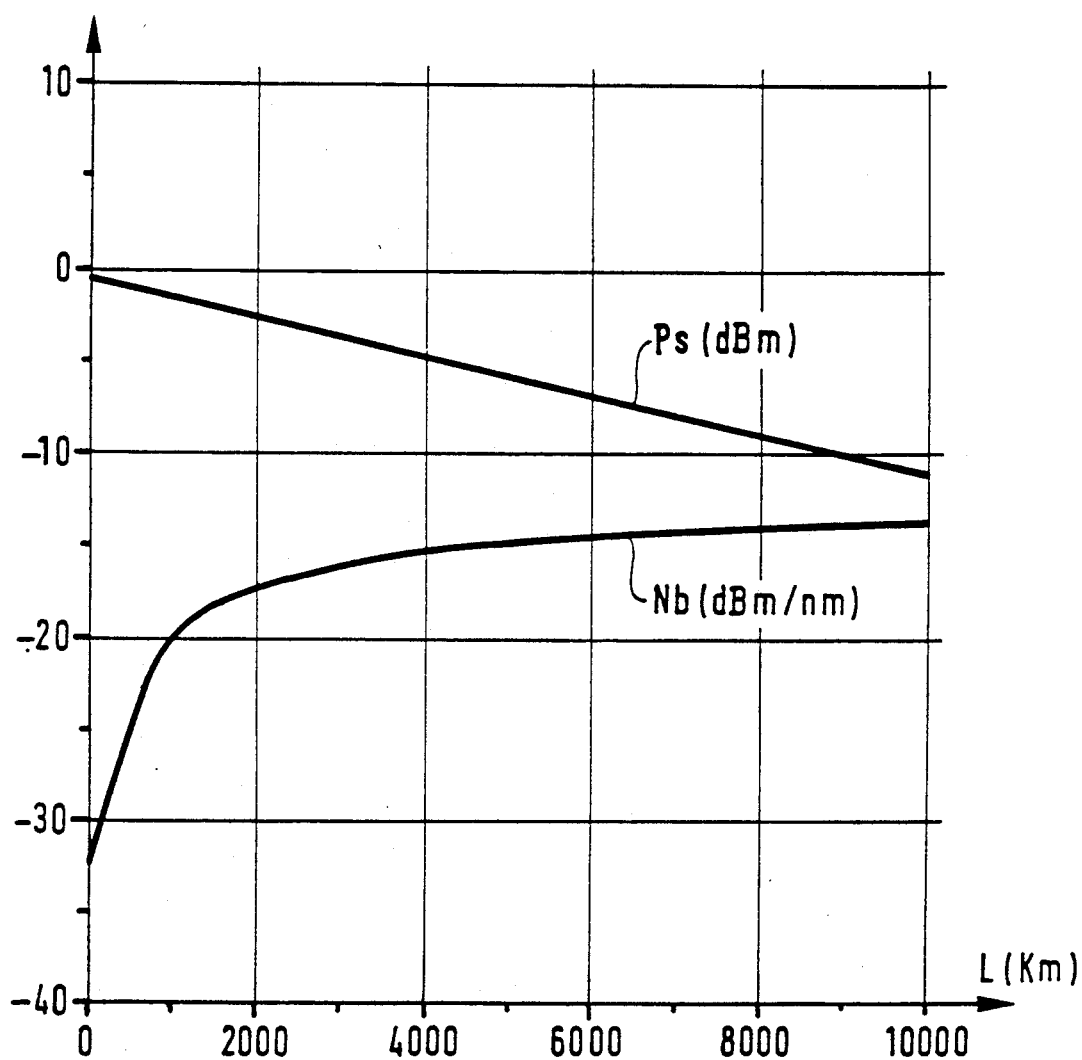
FIG. 4 is analogous to FIG. 1, but for a system of the invention.

FIG. 4 shows how the power Ps of the signal varies as a function of the distance travelled L (km), and also how the corresponding noise level Nb varies.

The amplifiers implemented in the system of the invention have a self-filtering function around 1550 nm. The noise peak generated around 1532 nm, as visible in FIGS. 2 and 3, is reabsorbed in the fibers and another noise peak appears at 1550 nm. The optical amplifiers of the system of the invention therefore preferentially transfer energy to around 1550 nm. The signal locked onto said amplification peak therefore benefits from the same gain as the noise and therefore does not suffer from competition therefrom. The general behavior obtained is the same as if a filter were to be placed after each amplifier, thereby justifying the term "self-filtering".

As shown by the curves of FIG. 4, the signal-to-noise ratio remains satisfactory after 10,000 km of propagation, without requiring any intermediate optical filters to be used.

Naturally, the invention is not limited to the embodiment described above. Without going beyond the ambit of the invention, any means may be replaced by equivalent means.

Thus, the distances between the amplifiers may be different from the value mentioned in the above example; the pumping powers and the lengths of erbium-doped fiber should be adjusted accordingly. In the extreme case of "distributed amplification", where the entire fiber used in the system is doped with erbium and where pumps are installed from place to place is also possible. It is also possible for pumping to be performed around 980 nm.

In another variant embodiment, the amplifiers of a system of the invention need not all be identical, and the output power therefrom need not be constant, particularly if the power of the output signal is servo-controlled. The distances between amplifiers need not be constant.

We claim:

1. A telecommunications system incorporating a plurality of optical amplifiers containing erbium-doped fibers for transmission of signals of which at least one signal has a wavelength of approximately 1550 nm, and said system comprising at least one erbium-doped optical fiber amplifier which performs a self-filtering function, such that the noise peak which said at least one optical fiber amplifier generates at around 1536 nm is reabsorbed and appears at 1550 nm, wherein the pump power ranges between 2 mW and 300 mW at a wavelength of 980 nm $\pm$ 40 nm and/or 1480 nm $\pm$ 40 nm, the length of said doped fiber ranges between 1 m and 60 km, and a core of said fiber being aluminum-free, doped with erbium in a proportion of between 0.1 ppb and 500 ppm, and doped with germanium in a proportion of more than 2%, such that the signal/noise ratio of said telecommunications system remains sufficient after signal propagation over 10,000 km, without the need of an intermediate filter.

2. A telecommunications system according to claim 1, wherein the distance between two of said amplifiers lies in the range 0 to 300 km, where the value 0 corresponds to a so-called "distributed" amplification.

* * * * *